(12) United States Patent
Nainar et al.

(10) Patent No.: US 11,968,172 B2
(45) Date of Patent: Apr. 23, 2024

(54) DEVICE ADDRESS ROTATION AUTHORIZATION AND VERIFICATION

(71) Applicant: Cisco Technology, Inc., San Jose, CA (US)

(72) Inventors: Nagendra Kumar Nainar, Morrisville, NC (US); Carlos M. Pignataro, Cary, NC (US); Robert E. Barton, Richmond (CA); Jerome Henry, Pittsboro, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 116 days.

(21) Appl. No.: 17/677,134

(22) Filed: Feb. 22, 2022

(65) Prior Publication Data

US 2023/0269219 A1    Aug. 24, 2023

(51) Int. Cl.
*H04L 61/5014* (2022.01)
*H04W 12/108* (2021.01)
(Continued)

(52) U.S. Cl.
CPC ....... *H04L 61/5014* (2022.05); *H04W 12/108* (2021.01); *H04W 12/71* (2021.01); *H04L 2101/622* (2022.05)

(58) Field of Classification Search
CPC ......... H04L 61/5014; H04L 2101/622; H04W 12/108; H04W 12/71
See application file for complete search history.

(56) References Cited

U.S. PATENT DOCUMENTS

2010/0299732 A1    11/2010   Zhang et al.
2015/0063205 A1*    3/2015   Elliott ................ H04L 63/0421
                                                               370/328
(Continued)

FOREIGN PATENT DOCUMENTS

WO    WO-2015030773 A1 *  3/2015  ......... H04L 61/2038

OTHER PUBLICATIONS

Dang et al., "Efficient ID-Based Registration Protocol Featured with User Anonymity in Mobile IP Networks", Feb. 2010, IEEE Transactions on Wireless Communications, vol. 9, No. 2, pp. 594-604 (Year: 2010).*

(Continued)

*Primary Examiner* — Kenneth W Chang
(74) *Attorney, Agent, or Firm* — Edell, Shapiro & Finnan, LLC

(57) ABSTRACT

An authorization device obtains a registration request associated with an end device, the registration request including a new randomized media access control (MAC) address associated with the end device; determines whether the end device is authorized to use the new randomized MAC address; transmits a message to the end device with a first randomly generated number when it is determined that the end device is authorized to use the new randomized MAC address; obtains integrity information associated with the end device, the first integrity information being computed based on the first randomly generated number; transmits a request to a validation system to validate the end device based on the first integrity information; obtains an indication that the end device is validated; determines policies associated with the end device when it is determined that the end device is validated; and applies the policies to the end device.

20 Claims, 5 Drawing Sheets

(51) Int. Cl.
    *H04W 12/71*      (2021.01)
    *H04L 101/622*    (2022.01)

(56) References Cited

U.S. PATENT DOCUMENTS

| | | | |
|---|---|---|---|
| 2015/0078379 A1* | 3/2015 | Wijnands | H04L 45/74 |
| | | | 370/390 |
| 2016/0302058 A1* | 10/2016 | Mestanov | H04L 61/5076 |
| 2017/0257733 A1* | 9/2017 | Arneson | H04W 12/50 |
| 2020/0229071 A1* | 7/2020 | Ansley | H04W 12/02 |
| 2020/0244655 A1* | 7/2020 | Gundavelli | H04W 12/06 |
| 2020/0322145 A1 | 10/2020 | Sheth et al. | |
| 2020/0322375 A1 | 10/2020 | Sheth et al. | |
| 2021/0036988 A1 | 2/2021 | McKibben et al. | |
| 2021/0176255 A1 | 6/2021 | Hill et al. | |

OTHER PUBLICATIONS

Ansley, "Status of IEEE 802.11 Randomized and changing MAC address Study Group," IEEE P802.11—Randomized and Changing MAC Address (RCM) Study Group (SG)—Meeting Update, https://www.ieee802.org/11/Reports/rcmtig_update.htm, Jan. 2021, 2 pages.

* cited by examiner

400

| 402 | OBTAINING A REGISTRATION REQUEST ASSOCIATED WITH AN END DEVICE, THE REGISTRATION REQUEST INCLUDING A NEW RANDOMIZED MAC ADDRESS ASSOCIATED WITH THE END DEVICE |

↓

| 404 | DETERMINING WHETHER THE END DEVICE IS AUTHORIZED TO USE THE NEW RANDOMIZED MAC ADDRESS |

↓

| 406 | TRANSMITTING A MESSAGE TO THE END DEVICE WITH A FIRST RANDOMLY GENERATED NUMBER WHEN IT IS DETERMINED THAT THE END DEVICE IS AUTHORIZED TO USE THE NEW RANDOMIZED MAC ADDRESS |

↓

| 408 | OBTAINING INTEGRITY INFORMATION ASSOCIATED WITH THE END DEVICE, THE INTEGRITY INFORMATION BEING COMPUTED BASED ON THE FIRST RANDOMLY GENERATED NUMBER |

↓

| 410 | TRANSMITTING A REQUEST TO A VALIDATION SYSTEM TO VALIDATE THE END DEVICE BASED ON THE FIRST INTEGRITY INFORMATION |

↓

| 412 | OBTAINING, FROM THE VALIDATION SYSTEM, AN INDICATION THAT THE END DEVICE IS VALIDATED |

↓

| 414 | DETERMINING POLICIES ASSOCIATED WITH THE END DEVICE WHEN IT IS DETERMINED THAT THE END DEVICE IS VALIDATED |

↓

| 416 | APPLYING THE POLICIES TO THE END DEVICE |

FIG.4

DEVICE ADDRESS ROTATION AUTHORIZATION AND VERIFICATION

TECHNICAL FIELD

The present disclosure relates to secure wireless networking.

BACKGROUND

In an effort to improve privacy of an end device, many mobile operating system vendors are periodically changing (or "rotating") a device address (e.g., a station address) used to identify wireless end devices on a wireless network. By changing the device address, it can be more difficult for an eavesdropper to gain private information associated with the device, but also, in some circumstances, more difficult to determine policies associated with the device.

BRIEF DESCRIPTION OF THE DRAWINGS

FIG. 4 is a flowchart of a method of performing a verification of an end device using a new randomized MAC address, in accordance with an example embodiment.

DESCRIPTION OF EXAMPLE EMBODIMENTS

Overview

Presented herein are embodiments that provide verification of an end device using a new randomized media access control (MAC) address and application of policies associated with the end device. An authorization server obtains a registration request associated with an end device from an access point. The registration request includes a MAC address associated with the end device. The authorization server determines whether the end device is authorized to use the new randomized MAC address and transmits a message to the end device with a first randomly generated number when it is determined that the end device is authorized to use the new randomized MAC address. The authorization server obtains first integrity information associated with the end device, the first integrity information being computed based on the first randomly generated number, and transmits a request to a validation system to validate the end device based on the first integrity information. The authorization server obtains, from the validation system, an indication that the end device is validated and determines policies associated with the end device when it is determined that the end device is validated. The polices are applied to the end device.

Example Embodiments

Techniques are provided for improved randomized and changing MAC addresses (RCM) methods by verifying an identity of an end device with a verification server and applying polices to the end device based on the verification. Client MAC randomization may be implemented by device vendors to provide privacy to devices and to reduce the ability to track devices. MAC randomization introduces various operational challenges, such as policy application. For example, it may be difficult to apply policies to a particular device if the device continuously rotates its MAC address. Therefore, it would be beneficial to uniquely identify a device irrespective of the MAC address associated with the device.

A unique identifier associated with a device, such as a canary stamp or token, may be leveraged to provide a stable identifier that is preserved across MAC address rotations. However, the direct use of a canary stamp or token may counteract the benefit of the MAC address randomization. For example, if a device replies to an incoming request with the device's canary stamp or token, a malicious user may have triggered the request to obtain the canary stamp or token, thereby obtaining the actual user identity. A need exists for a more robust and secure method of using a canary stamp or token for unique user identification.

Figure 1:
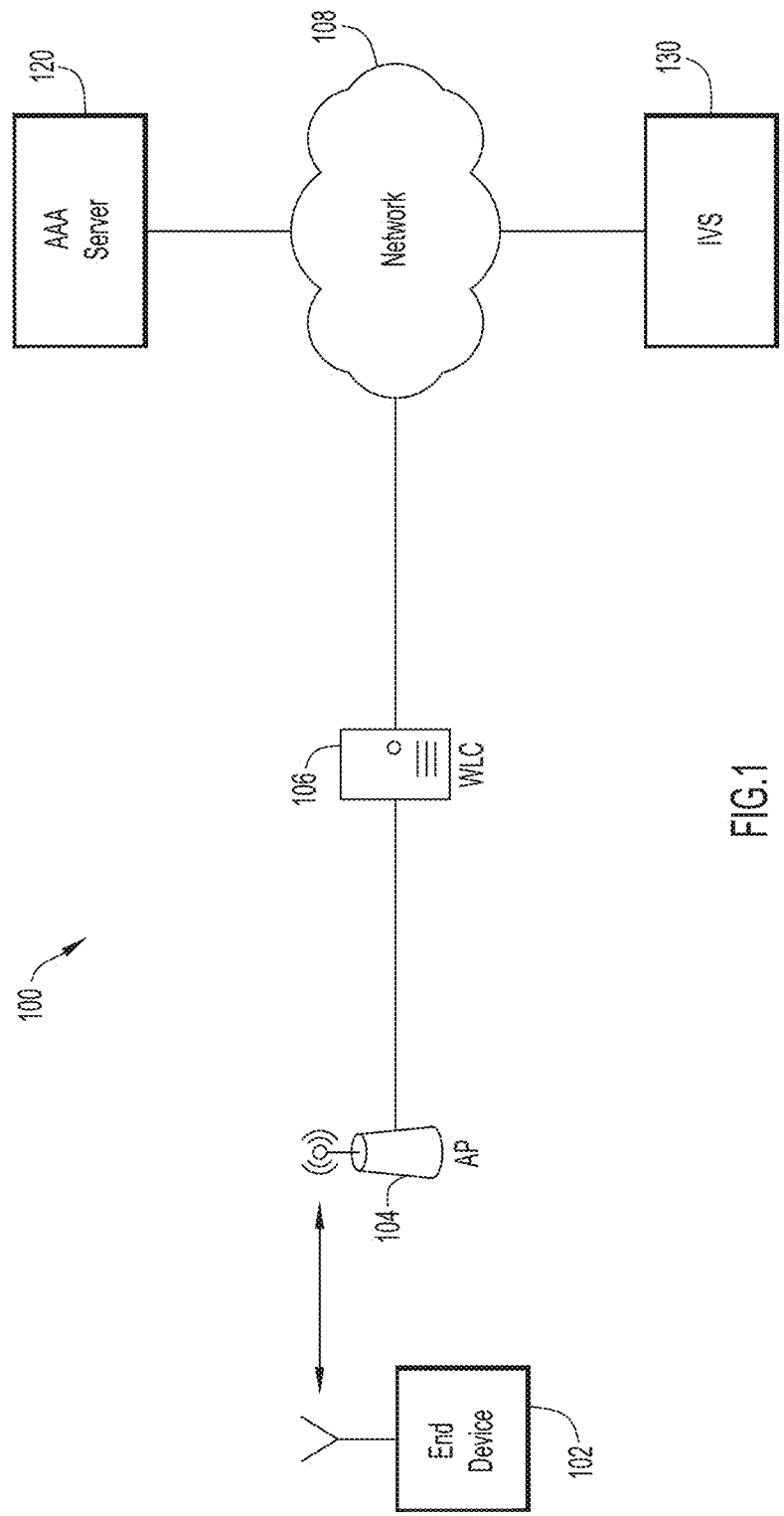
FIG. 1 is an overview diagram illustrating a network environment configured to perform verification of an end device using a new randomized media access control (MAC) address, in accordance with an example embodiment.

FIG. 1 is an overview diagram illustrating a network environment 100 configured to provide an integrity verification for an end device using a new randomized MAC address, in accordance with an example embodiment. The network environment 100 includes an end device 102 in communication with a wireless access point (AP) 104. The AP 104 is in communication with a wireless local area network (LAN) controller (WLC) 106. The WLC 106 communicates with an Authentication, Authorization, Accounting (AAA) server 120 via a network 108. The AAA server 120 additionally communicates with an Integrity Verification Server (IVS) 130 via network 108. In some embodiments, end device 102 may communicate with IVS 130.

Generally, end device 102 may be associated with any electronic wireless device, machine, robot, etc. wishing to initiate a flow in systems discussed herein. The terms 'device', 'electronic device', 'UE', 'automation device', 'computing device', 'machine', 'robot', and variations thereof are inclusive of devices used to initiate a communication, such as a computer, a vehicle and/or any other transportation related device having electronic devices configured thereon, an automation device, an enterprise device, an appliance, an Internet of Things (IoT) device, etc., a personal digital assistant (PDA), a laptop or electronic notebook, a cellular telephone, a smart phone, an Internet Protocol (IP) phone, any other device and/or combination of devices, component, element, and/or object capable of initiating voice, audio, video, media, or data exchanges within network environment 100. End device 102 discussed herein may also be inclusive of a suitable interface to a human user such as a microphone, a display, a keyboard, or other terminal equipment.

End device 102 discussed herein may also be any device that seeks to initiate a communication on behalf of another entity or element such as a program, a database, or any other component, device, element, or object capable of initiating an exchange within systems discussed herein. It is to be understood that any number of end devices may be present in systems discussed herein. End device 102 may be configured with hardware (e.g., communications units, receiver(s), transmitter(s), antenna(s) and/or antenna arrays, processor(s), memory element(s), baseband processor(s) (modems), etc.), software, logic, and/or the like (e.g., a wireless wide area network (WWAN) (e.g., cellular) communications unit, a wireless local area network (WLAN) (e.g., Wi-Fi®), etc.) to facilitate over-the-air Radio Frequency (RF) connections with any combination of access networks, such as a WLAN facilitated via AP 104.

AP 104 may include any combination of hardware (e.g., communications units, receiver(s), transmitter(s), antenna(s) and/or antenna array(s), processor(s), memory element(s), baseband processor(s) (modems), etc.), controllers, software, logic, and/or the like to facilitate over-the-air RF WLAN connections (e.g., Wi-Fi® connections) with one or more devices, such as end device 102).

Generally, WLC 106 may provide/be responsible for WLAN control functions such as, WLAN-based access authentication services, authorization services, intrusion prevention, RF management, and/or the like in which various authentication/authorization services may be performed. AAA server 120 and IVS 130 may also facilitate authentication/authorization services. Generally, authentication refers to a process in which an entity's identity is authenticated, typically by providing evidence that it holds a specific digital identity such as an identifier/identity and corresponding credentials/authentication attributes/etc. Generally, authorization can be used to determine whether a particular entity is authorized to perform a given activity, typically inherited from authentication when logging on to an application or service. In various instances, authorization may be determined based on a range of policies or restrictions, for example, time-of-day restrictions, RCM window restrictions, or physical location restrictions, or restrictions against multiple accesses by the same entity or user/device.

According to embodiments described herein, end device 102 utilizes a device address during wireless communication with the AP 104. The device address identifies the end device 102 to the AP 104 and to other devices on a wireless network (e.g., WLC 106, AAA server 120, etc.). The device address may be a MAC address. For security purposes, end device 102 may rotate MAC addresses when moving from one wireless network to another wireless network, or even when communicating via the same wireless network. Additionally, end device 102 may use a different randomized MAC address instead of a physical MAC address associated with end device 102 for initial negotiations with a wireless network.

In some embodiments, end device 102 may additionally rotate its MAC address after a period of time has expired. End device 102 may be configured with window information, such as an allowable RCM window that defines how frequently the end device 102 may rotate the MAC address while in the same wireless network (a frequency with which the end device 102 MAC address rotation may be performed). End device 102 may not be authorized to rotate its MAC address until a time associated with the RCM window has expired.

A length of the RCM window may vary depending on a profile associated with a user of the end device 102. For example, if the end device 102 is a client device associated with a sales executive dealing in multi-million dollar discussions, the length of the RCM window may be relatively short to allow the client device to rotate the MAC address frequently to ensure privacy and security. On the other hand, a length of an RCM window associated with a client device of an administrator user who handles non-critical applications may be as long because security may not be as critical and the client device may not need to rotate its MAC address as frequently. When the end device 102 submits an initial authentication/association request, the end device 102, AP 104, and/or the AAA server 120 may negotiate a length of the RCM window on a per-user basis. A length of the RCM window may be associated with a profile of a user of the end device 102 stored in a database at the AAA server 120 or may be a one-time negotiation that occurs between end device 102 and AP 104.

Embodiments of this disclosure provide for determining whether end device 102 is authorized to rotate a MAC address, validating end device 102 when the end device 102 is authorized to rotate the MAC address, and applying policies based on the validation. For example, as described below with respect to FIG. 2, AAA server 120 may receive a registration request from AP 104/WLC 106 including a new randomized MAC address associated with end device 102. Although AP 104 and WLC 106 may be configured as separate entities (as illustrated in FIG. 1), for purposes of simplicity and brevity, AP 104 and WLC 106 may be referred to herein as "AP 104/WLC 106." AAA server 120 may determine whether end device 102 is allowed to use the new randomized MAC address (i.e., whether end device 102 is allowed to rotate the MAC address based on the RCM window associated with end device 102). For example, AAA server 120 may determine whether a period of time (defined by the RCM window) since the end device 102 last performed a MAC address rotation has expired. If end device 102 is allowed to rotate the MAC address, AAA server 120 may transmit a challenge to the end device 102 to verify the identity of the end device 102. The challenge includes a randomly generated number (e.g., a NONCE) generated by AAA server 120.

End device 102 computes unique identifier/integrity information based on the NONCE received from the AAA server 120. The unique identifier/integrity information may include a hardware fingerprint or a canary stamp/token that can indicate or otherwise include a signed measurement associated with a device for verifying trustworthiness of the device. A canary stamp/token is a hash computed based on an endorsement key of a Trusted Platform Module (TPM) of a device, such as end device 102. A TPM can be a system component containing state that is separate from the host system on which the TPM reports identity and/or other information. The TPM memory can be shielded from access by an entity other than the TPM. Since the TPM prevents unauthorized access to its memory, a canary stamp or token computed based on an endorsement key of the TPM is trusted integrity information associated with the host device of the TPM (e.g., end device 102).

After computing the canary stamp or token based on the NONCE received from AAA server 120, end device 102 transmits the canary stamp/token to the AAA server 120. AAA server 120 receives the canary stamp/token associated with end device 102 and transmits a request to IVS 130 to validate end device 102. The request includes an integrity verification request and a unique user identity information (e.g., a physical MAC address and other information). IVS 130 verifies the integrity of end device 102 based on, for example, the canary stamp/token associated with end device 102 and transmits, to AAA server 120, an indication that end device 102 has been verified along with unique user information associated with a user of end device 102.

AAA server 120 identifies policies (e.g., policies associated with MAC address rotation and/or other policies) associated with end device 102 using the unique user identity information. In some embodiments, AAA server 120 may identify whether the user is authorized to use the new randomized MAC address based on the RCM window after AAA server 120 obtains an indication that end device 102 has been verified (i.e., instead of making the determination after receiving the registration request). When the policies associated with the user of end device 102 have been determined, the policies are applied to end device 102.

In other embodiments, described below with respect to FIG. 3, a bidirectional verification may be performed in which end device 102 additionally validates/authenticates a requesting node (e.g., AP 104, WLC 106, and/or AAA server 120). By validating/authenticating a requesting node, end device 102 may ensure that a node requesting sensitive information associated with end device 102 is a legitimate node and is not a malicious user attempting to steal information. In this embodiment, end device 102 may send a registration request to AP 104/WLC 106 including a locally generated random number (e.g., a NONCE). The NONCE indicates a challenge from end device 102 for any entity that requires a canary stamp validation before onboarding end device 102 to network 108. If the network (including AP 104, WLC 106, AAA server 120, and/or other devices) does not support or require a canary stamp, the NONCE may be ignored.

In this embodiment, the authorization server that requires a canary stamp from end device 102 (e.g., AP 104/WLC 106/AAA server 120) may transmit a message to end device 102 with a random NONCE value. The message additionally includes a local canary stamp/token computed by the requesting node (e.g., AP 104/WLC 106/AAA server 120) that was computed based on the NONCE received from end device 102 in the registration request. In this embodiment, end device 102 establishes a one-time connectivity to IVS 130 to validate the requesting node (e.g., AP 104/WLC 106/AAA server 120) using the received canary stamp/token. Once the requesting node is validated, end device 102 computes a canary stamp/token using the random NONCE value received from the AAA server 120 and transmits the canary stamp/token to AAA server 120. AAA server 120 validates end device 102 with IVS 130 in a similar manner as described above.

Figure 2:
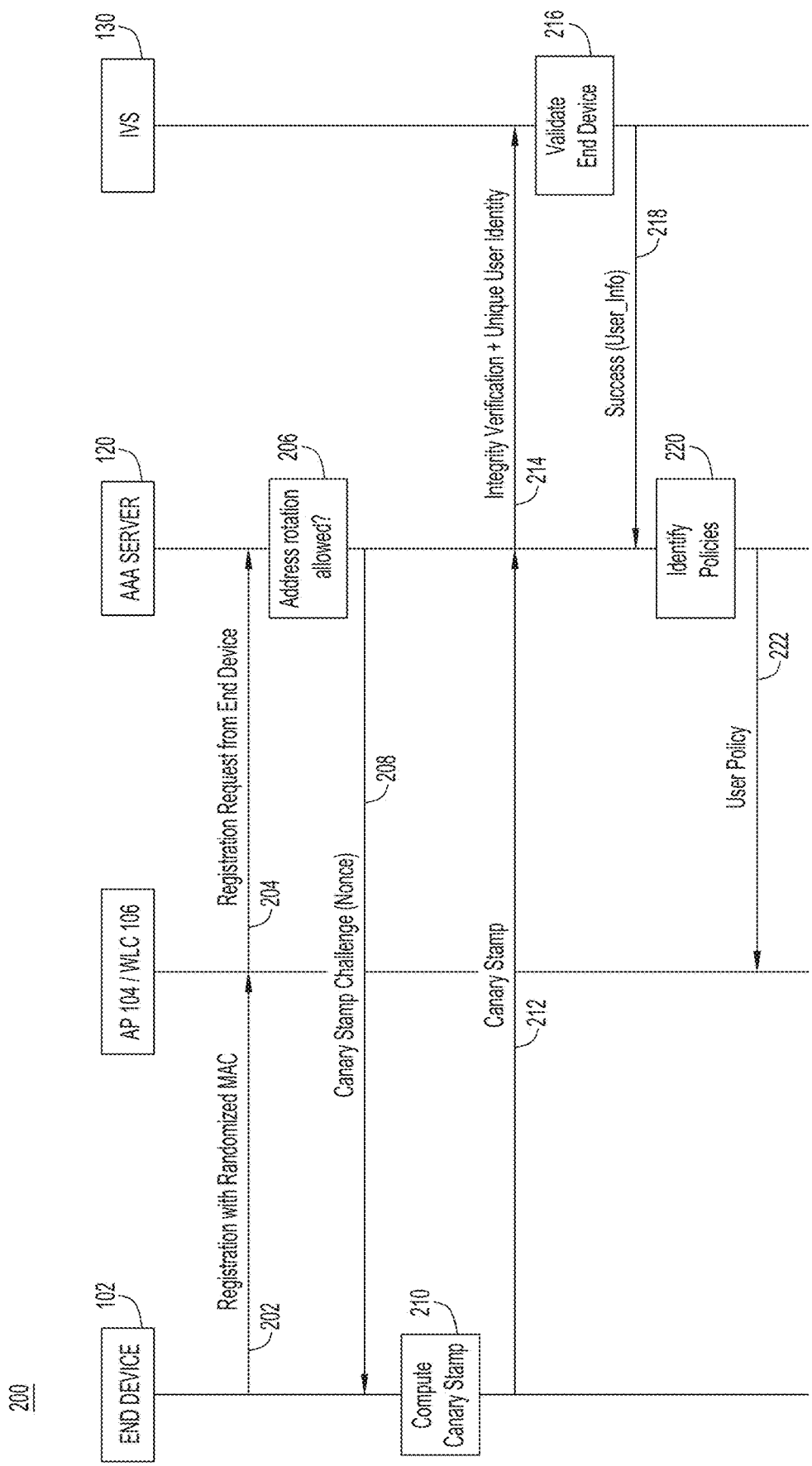
FIG. 2 illustrates a sequence diagram showing a unidirectional verification of an end device using a new randomized MAC address, according to an example embodiment.

Reference is now made to FIG. 2. FIG. 2 is a sequence diagram of a unidirectional verification process 200 of end device 102 according to an example embodiment. FIG. 2 shows end device 102, AP 104/WLC 106, AAA server 120, and IVS 130.

At 202, end device 102 may transmit a registration request with a new randomized MAC address to AP 104/WLC 106 and, at 204, AP 104/WLC 106 may forward the new randomized MAC address to AAA server 120. In one embodiment, end device 102 may be a new client onboarding network 108 with a new MAC address. In another embodiment, end device 102 may be an existing device rotating a MAC address and, therefore, using a new randomized MAC address. In another embodiment, end device 102 may be an existing client changing a service set identifier (SSID) without revealing a user identification. An indication of whether the end device 102 is a new client or an existing client with a new MAC address/SSID may be indicated by, for example, using new flags or additional information element (IE) fields in frames exchanged between end device 102 and AP 104/WLC 106.

At 206, AAA server 120 may determine whether the MAC address rotation is allowed. For example, AAA server 120 may leverage details associated with end device 102 to determine whether a MAC address rotation is allowed within the time threshold defined by the RCM window for a user associated with end device 102. AAA server 120 may use various forms of identity for end device 102 to determine whether the MAC address rotation is allowed. In one embodiment, AAA server 120 may use 802.1X authentication, in which a username or certificate may be used to identify the end device 102. If the MAC address rotation is not allowed (i.e., the time threshold associated with the RCM window is not exceeded based on a policy associated with the user of end device 102), AAA server 120 transmits an error/notification message toward end device 102 indicating that the MAC address rotation is unauthorized.

If the MAC rotation is allowed, at 208, AAA server 120 transmits a canary stamp/token challenge message to the end device 102 with a randomly generated number (e.g., a NONCE). At 210, end device 102 computes a canary stamp/token based on the NONCE and, at 212, end device 102 transmits the canary stamp/token to AAA server 120. AAA server 120 receives the canary stamp/token and validates/authenticates the canary stamp/token. The canary stamp/token may be authenticated to identify details associated with end device 102, such as an identity of a user of end device 102, a physical MAC address of end device 102. At 214, AAA server 120 transmits a request to IVS 130 to validate the end device 102. The request includes a request for an integrity verification to determine whether the user of end device 102 is a genuine user and a unique user identity (e.g., a physical MAC address of end device 102 and/or additional information). In some embodiments, the request may include an indication that the canary stamp has been validated.

At 216, IVS 130 validates the end device 102 based on the information received in the request. If the end device 102 is validated, at 218, IVS 130 transmits to AAA server 120 an indication that the end device 102 has been successfully validated. The indication may include additional user information associated with a user of end device 102. In one embodiment, the MAC rotation authorization check described at 206 may be performed at this point instead of prior to sending the canary stamp challenge. In that embodiment, the MAC rotation authorization check may be performed after the end device 102 is validated and it is determined that the MAC rotation or new registration request is from a genuine user. At 220, when the end device 102 has been validated, AAA server 120 uses the user information to identify policies associated with the user/end device 102. The policies may include policies associated with MAC address rotation and/or additional policies associated with the user/end device 102. At 222, AAA server 120 transmits the policy information to AP 104/WLC 106 to apply the policies to end device 102.

Figure 3:
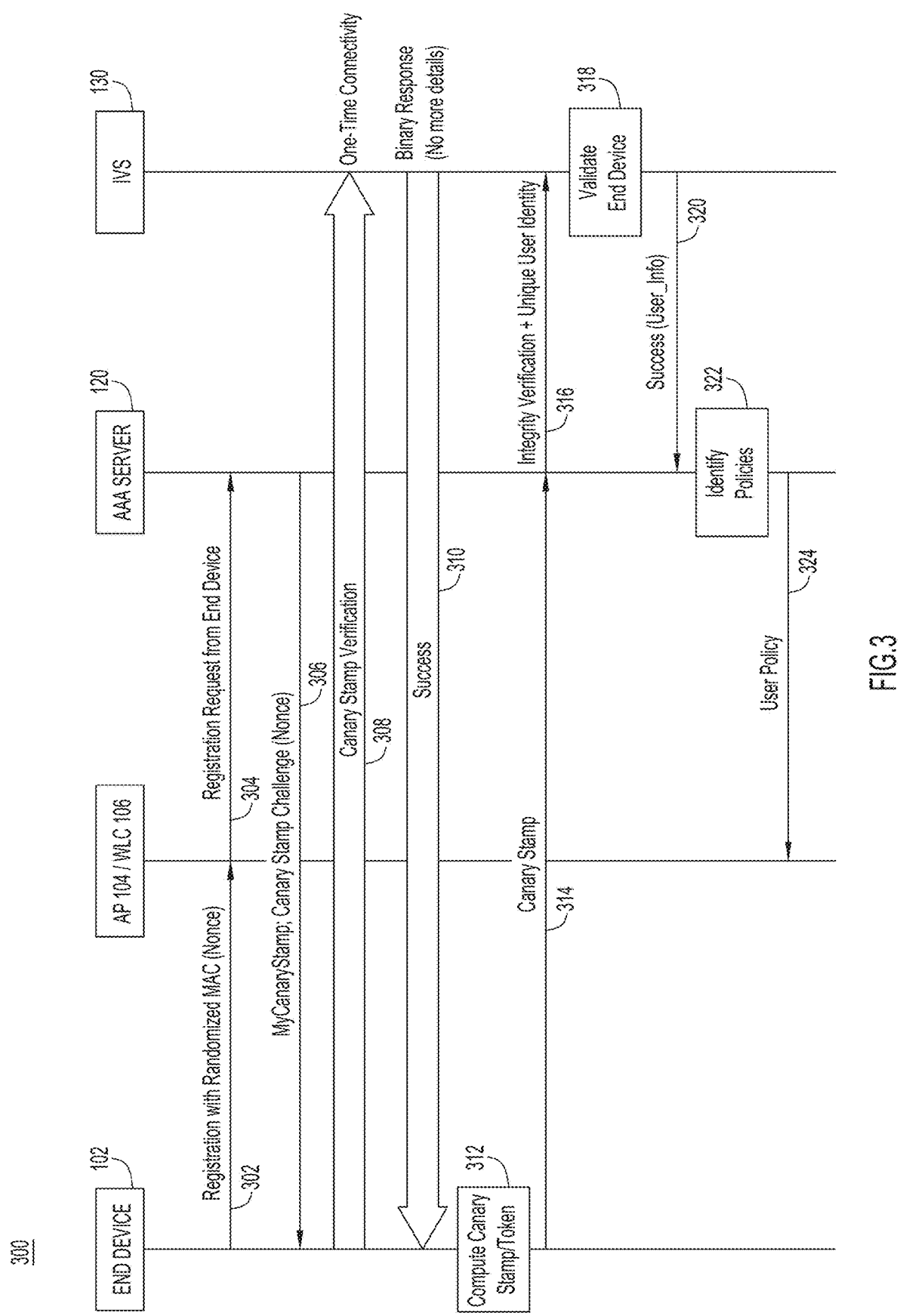
FIG. 3 illustrates a sequence diagram showing a bidirectional verification of a requesting node and an end device using a new randomized MAC address, according to an example embodiment.

Reference is now made to FIG. 3. FIG. 3 is a sequence diagram of a bidirectional verification process 300 of end device 102 and a requesting node (e.g., AP 104, WLC 106, or AAA server 120) according to an example embodiment. FIG. 3 illustrates end device 102, AP 104/WLC 106, AAA server 120, and IVS 130.

At 302, end device 102 transmits a request to AP 104/WLC 106 with a new randomized MAC address and a locally-generated random number (e.g., a NONCE). The NONE is a challenge from end device 102 for any entity that requires a canary stamp validation before onboarding the end device 102 to the network. If the network (and, therefore, AP 104/WLC 106/AAA server 120) does not support or require a canary stamp validation, the nodes (e.g., AP 104/WLC 106/AAA server 120) can ignore the NONCE. At 304, AP 104/WLC 106 forwards the registration request to AAA server 120.

At 306, AAA server 120 transmits a message to end device 102 including a random number (e.g., a NONCE) generated by the node in direct communication with end device 102 (e.g., AP 104/WLC 106/AAA server 120) a canary stamp/token generated by the node (e.g., AP 104/WLC 106/AAA server 120). The canary stamp/token is computed based on the NONCE received from end device 102 in the registration request. In one embodiment, prior to transmitting the message, AAA server 120 may determine whether the end device 102 is allowed to use the new randomized MAC address based on an RCM window associated with a user of the end device 102. At 308, end device 102 establishes a one-time connectivity to IVS 130 to validate the canary stamp received from AP 104/WLC 106/AAA server 120. At 310, IVS 130 transmits a binary response to end device 102 indicating whether the node (e.g., AP 104/WLC 106/AAA server 120) has been validated.

If the node has been validated, at 312, end device 102 computes a canary stamp/token based on the NONCE received from AP 104/WLC 106/AAA server 120. At 314, end device 102 transmits the canary stamp/token to AAA server 120 and AAA server 120 validates the canary stamp/token. The canary stamp/token is used to identify details associated with the user of end device 102 and additional information (e.g., a profile associated with the user that indicates an RCM window associated with the user). At 316, similar to 216 described above with respect to FIG. 2, AAA server 120 transmits an integrity verification request and unique user identity to IVS 130. At 318, IVS validates end device 102 and, at 320, IVS 130 transmits an indication that the validation is successful. The indication may include unique user information associated with end device 102 or a user of end device 102.

At 322, AAA server 120 identifies policies associated with end device 102 or the user of end device 102. The policies may include policies associated with MAC address rotation and/or additional policies associated with the user/end device 102. In one embodiment, prior to identifying the policies, AAA server 120 may perform a MAC rotation authorization check to determine, based on the RCM associated with end device 102, whether end device 102 is allowed to use the new MAC address. At 324, AAA server 120 transmits user policy information to AP 104/WLC 106 to apply the policies to the wireless access of the end device 102.

FIG. 4 is a flowchart of a method of verifying an end device using integrity information associated with the end device, in accordance with an example embodiment. In some embodiments, the method 400 discussed below with respect to FIG. 4 is performed by a network infrastructure device, such as end device 102, AP 104, WLC 106, AAA server 120, and/or IVS 130.

At 402, a registration request associated with an end device is obtained. For example, AAA server 120 may obtain a registration request associated with end device 102 from AP 104/WLC 106. The registration request may include a new randomized MAC address associated with end device 102. For example, end device 102 may have rotated MAC addresses, may be a new client onboarding to a network, may be an existing client changing SSID, etc.

At 404, a determination is made whether the end device is authorized to use the new randomized MAC address. For example, AAA server 120 may determine whether a user associated with end device 102 is allowed to use a new randomized MAC address based on an RCM window associated with the user or end device 102. In one embodiment, if the RCM window associated with the user or end device 102 has not expired, AAA server 120 may reply with an error notification indicating an unauthorized MAC rotation.

At 406, a message is transmitted to the end device with a first randomly generated number when it is determined that the end device is authorized to use the new randomized MAC address. AAA server 120 may transmit a NONCE to end device 102 when the RCM window associated with the user or end device 102 has expired.

At 408, integrity information associated with the end device is obtained. The integrity information is computed based on the first randomly generated number. In one embodiment, end device 102 may compute a canary stamp or token based on the NONCE received from AAA server 120. In other embodiments, end device 102 may compute a different type of integrity information. AAA server 120 obtains the integrity information from end device 102.

At 410, a request is transmitted to a validation system to validate the end device based on the first integrity information. AAA server 120 may transmit the request to IVS 130 to validate end device 102 based on the canary stamp or other integrity information computed by end device 102.

At 412, an indication that the end device is validated is obtained from the validation system. AAA server 120 may obtain a response from IVS 130 indicating that the end device 102 has been validated. The response may include unique identifier information associated with end device 102 and/or a user of end device 102. At 414, policies associated with the end device 102 are determined when it is determined that the end device 102 is validated. The policies may be associated with rotation of MAC addresses or the policies may be different policies. At 416, the policies are applied to the end device.

Figure 5:
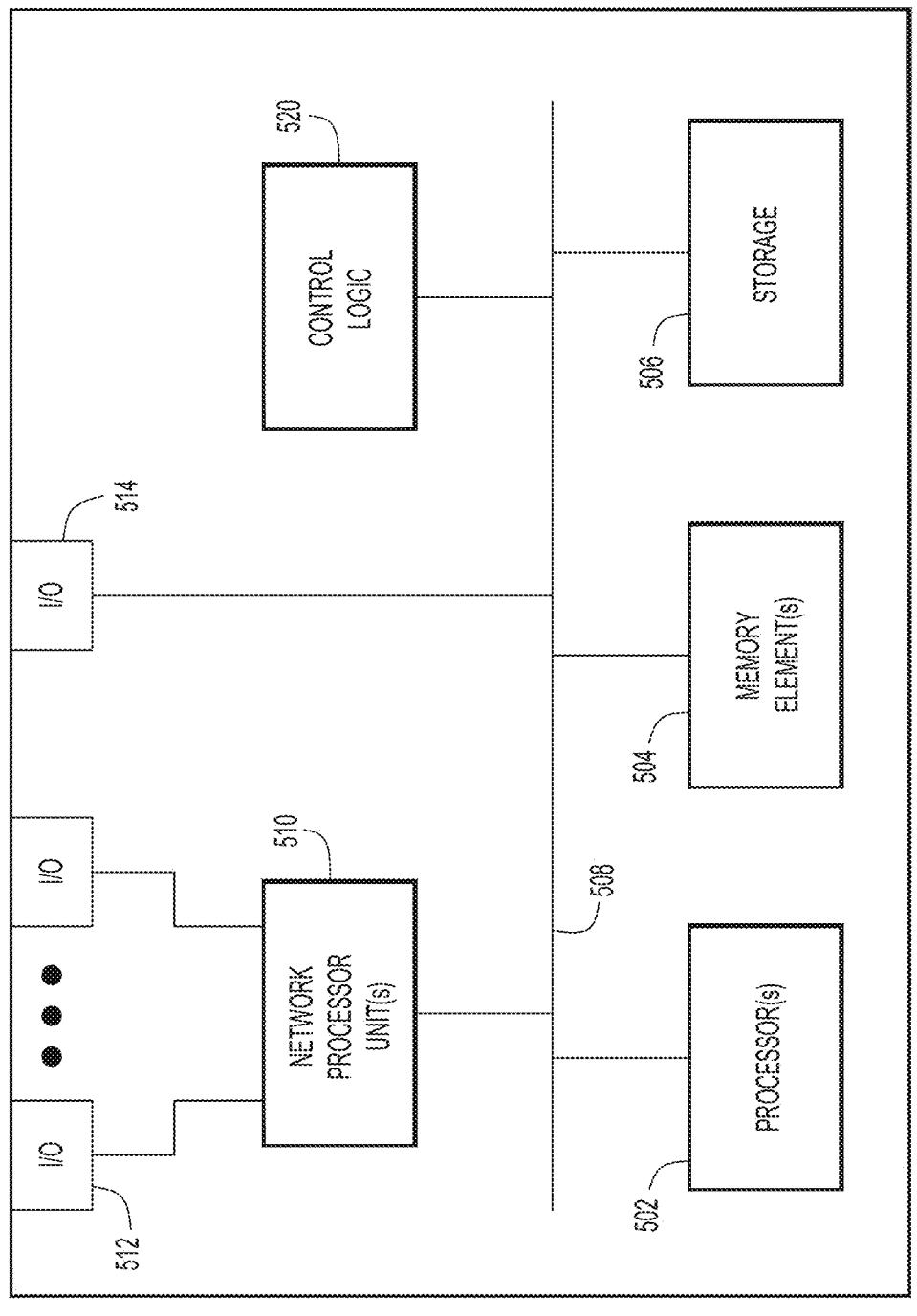
FIG. 5 is a hardware block diagram of a device that may perform functions associated with operations discussed herein in connection with the techniques depicted in any one or more of FIGS. 1-4.

FIG. 5 is a hardware block diagram of a device 500 that may perform functions associated with operations discussed herein in connection with the techniques depicted in any one or more of FIGS. 1-4. In various embodiments, any of the devices described above (e.g., a wireless end device, an AP, a WLC, or an IVS) implement, in some embodiments, a computing architecture analogous to that described below with respect to the device 500.

In at least one embodiment, the device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for device 500 can overlap in any manner and are not limited to the specific allocation of instructions and/or operations described herein.

In at least one embodiment, processor(s) 502 is/are at least one hardware processor configured to execute various tasks, operations and/or functions for device 500 as described herein according to software and/or instructions configured for device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, physical layer (PHY), controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with device 500, and/or logic configured for memory element(s) 504 and/or storage 506. For example, any logic described herein (e.g., control logic 520) can, in various embodiments, be stored for device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of device 500 to communicate in order to exchange information and/or data. Bus 508 can be implemented with any architecture designed for passing control, data and/or information between processors, memory elements/storage, peripheral devices, and/or any other hardware and/or software components that may be configured for device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between device 500 and other systems, devices, or entities, via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 500 and other systems, devices, or entities to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to device 500. For example, I/O interface(s) 514 may provide a connection to external devices such as a keyboard, keypad, a touch screen, and/or any other suitable input and/or output device now known or hereafter developed. This may be the case, in particular, when the device 500 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display, particularly when the device 500 serves as a user device as described herein.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, compact disc (CD) read only memory (ROM) (CD-ROM), digital video disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a method is provided comprising obtaining, by an authorization server and from an access point, a registration request associated with an end device, the registration request including a new randomized media access control (MAC) address associated with the end device; determining whether the end device is authorized to use the new randomized MAC address; transmitting a message to the end device with a first randomly generated number when it is determined that the end device is authorized to use the new randomized MAC address; obtaining first integrity information associated with the end device, the first integrity information being computed based on the first randomly generated number; transmitting a request to a validation system to validate the end device based on the first integrity information; obtaining, from the validation system, an indication that the end device is validated; determining policies associated with the end device when it is determined that the end device is validated; and applying the policies to the end device.

In one example, the first integrity information includes a canary stamp. In another example, transmitting the message to the end device further comprises: transmitting, to the end device, second integrity information, wherein the second integrity information is associated with the access point or the authorization server, wherein the end device transmits the second integrity information to the validation system to validate the access point or the authorization server. In another example, the registration request includes a second randomly generated number generated by the end device, and the second integrity information is computed based on the second randomly generated number.

In another example, the end device is configured with window information that defines how frequently the end device may rotate MAC addresses. In another example, determining whether the end device is authorized to use the new randomized MAC address includes: determining whether a period of time since the end device last performed a MAC address rotation has expired, the period of time being defined by the window information. In another example, the first integrity information is generated based on a key unique to a trusted platform module (TPM) of the end device. In another example, the end device and the access point are wireless devices operating in a wireless network.

In another form, an apparatus is provided comprising a network interface configured to enable network communications; one or more processors; and one or more memories storing instructions that when executed configure the one or more processors to perform operations comprising: obtaining, from an access point, a registration request associated with an end device, the registration request including a new randomized media access control (MAC) address associated with the end device; determining whether the end device is authorized to use the new randomized MAC address; transmitting a message to the end device with a first randomly generated number when it is determined that the end device is authorized to use the new randomized MAC address; obtaining first integrity information associated with the end device, the first integrity information being computed based on the first randomly generated number; transmitting a request to a validation system to validate the end device based on the first integrity information; obtaining, from the validation system, an indication that the end device is validated; determining policies associated with the end device when it is determined that the end device is validated; and applying the policies to the end device.

In another form, a non-transitory computer readable storage medium is provided comprising instructions that when executed configure one or more processors to perform operations comprising: obtaining, from an access point, a registration request associated with an end device, the registration request including a new randomized media access control (MAC) address associated with the end device; determining whether the end device is authorized to use the new randomized MAC address; transmitting a message to the end device with a first randomly generated number when it is determined that the end device is authorized to use the new randomized MAC address; obtaining first integrity information associated with the end device, the first integrity information being computed based on the first randomly generated number; transmitting a request to a validation system to validate the end device based on the first integrity information; obtaining, from the validation system, an indication that the end device is validated; determining policies associated with the end device when it is determined that the end device is validated; and applying the policies to the end device.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., fourth generation (4G)/fifth generation (5G)/next generation (nG), an IEEE 802.11 (e.g., Wi-Fi®/Wi-Fi6®), IEEE 802.15 (e.g. Wireless Personal Area Networks (WPAN)), IEEE 802.16 (e.g., Worldwide Interoperability for Microwave Access (WiMAX)), Radio-Frequency Identification (RFID), Near Field Communication (NFC), Bluetooth™, millimeter (mm).wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining, by an authorization server and from an access point, a registration request associated with an end device, the registration request including a new randomized media access control (MAC) address associated with the end device;
   determining, by the authorization server, whether the end device is authorized to use the new randomized MAC address;
   transmitting, by the authorization server, a message to the end device with a first randomly generated number generated by the authorization server when it is determined that the end device is authorized to use the new randomized MAC address;
   obtaining, by the authorization server, first integrity information associated with the end device, the first integrity information being computed based on the first randomly generated number;
   transmitting, by the authorization server, a request to a validation system to validate the end device based on the first integrity information;
   obtaining, by the authorization server and from the validation system, an indication that the end device is validated;
   determining, by the authorization server, policies associated with the end device when it is determined that the end device is validated; and
   applying, by the authorization server, the policies to the end device.

2. The method of claim 1, wherein the first integrity information includes a canary stamp.

3. The method of claim 1, wherein transmitting the message to the end device further comprises:
   transmitting, to the end device, second integrity information, wherein the second integrity information is associated with the access point or the authorization server, wherein the end device transmits the second integrity information to the validation system to validate the access point or the authorization server.

4. The method of claim 3, wherein the registration request includes a second randomly generated number generated by the end device, and wherein the second integrity information is computed based on the second randomly generated number.

5. The method of claim 1, wherein the end device is configured with window information that defines how frequently the end device may rotate MAC addresses.

6. The method of claim 5, wherein determining whether the end device is authorized to use the new randomized MAC address includes:
   determining whether a period of time since the end device last performed a MAC address rotation has expired, the period of time being defined by the window information.

7. The method of claim 1, wherein the first integrity information is generated based on a key unique to a trusted platform module (TPM) of the end device.

8. The method of claim 1, wherein the end device and the access point are wireless devices operating in a wireless network.

9. An apparatus, comprising:
   a network interface configured to enable network communications;
   one or more processors; and
   one or more memories storing instructions that when executed configure the one or more processors to perform operations comprising:
      obtaining, from an access point, a registration request associated with an end device, the registration request including a new randomized media access control (MAC) address associated with the end device;
      determining whether the end device is authorized to use the new randomized MAC address;
      transmitting a message to the end device with a first randomly generated number generated by the apparatus, when it is determined that the end device is authorized to use the new randomized MAC address;
      obtaining first integrity information associated with the end device, the first integrity information being computed based on the first randomly generated number;
      transmitting a request to a validation system to validate the end device based on the first integrity information;
      obtaining, from the validation system, an indication that the end device is validated;
      determining policies associated with the end device when it is determined that the end device is validated; and
      applying the policies to the end device.

10. The apparatus of claim 9, wherein the first integrity information includes a canary stamp.

11. The apparatus of claim 9, wherein transmitting the message to the end device further comprises:
    transmitting, to the end device, second integrity information, wherein the second integrity information is associated with the access point or the apparatus, wherein the end device transmits the second integrity information to the validation system to validate the access point or the apparatus.

12. The apparatus of claim 11, wherein the registration request includes a second randomly generated number generated by the end device, and wherein the second integrity information is computed based on the second randomly generated number.

13. The apparatus of claim 9, wherein the end device is configured with window information that defines how frequently the end device may rotate MAC addresses.

14. The apparatus of claim 13, wherein determining whether the end device is authorized to use the new randomized MAC address includes:
    determining whether a period of time since the end device last performed a MAC address rotation has expired, the period of time being defined by the window information.

15. The apparatus of claim 9, wherein the first integrity information is generated based on a key unique to a trusted platform module (TPM) of the end device.

16. The apparatus of claim 9, wherein the end device and the access point are wireless devices operating in a wireless network.

17. A non-transitory computer readable storage medium comprising instructions that when executed configure one or more processors of an authorization server to perform operations comprising:
    obtaining, from an access point, a registration request associated with an end device, the registration request including a new randomized media access control (MAC) address associated with the end device;
    determining whether the end device is authorized to use the new randomized MAC address;
    transmitting a message to the end device with a first randomly generated number generated by the authorization server when it is determined that the end device is authorized to use the new randomized MAC address;
    obtaining first integrity information associated with the end device, the first integrity information being computed based on the first randomly generated number;
    transmitting a request to a validation system to validate the end device based on the first integrity information;
    obtaining, from the validation system, an indication that the end device is validated;
    determining policies associated with the end device when it is determined that the end device is validated; and
    applying the policies to the end device.

18. The non-transitory computer readable storage medium of claim 17, wherein transmitting the message to the end device further comprises:
    transmitting, to the end device, second integrity information, wherein the second integrity information is associated with the access point or a device associated with the one or more processors, wherein the end device transmits the second integrity information to the validation system to validate the access point or the device associated with the one or more processors.

19. The non-transitory computer readable storage medium of claim 18, wherein the registration request includes a second randomly generated number generated by the end device, and wherein the second integrity information is computed based on the second randomly generated number.

20. The non-transitory computer readable storage medium of claim 18, wherein determining whether the end device is authorized to use the new randomized MAC address includes:
    determining whether a period of time since the end device last performed a MAC address rotation has expired, the period of time being defined by window information that defines how frequently the end device may rotate MAC addresses.

* * * * *